US012440359B2

(12) United States Patent
Favreau et al.

(10) Patent No.: US 12,440,359 B2
(45) Date of Patent: Oct. 14, 2025

(54) BARRIER DEVICES, SYSTEMS, AND METHODS

(71) Applicant: Boston Scientific Scimed Inc., Maple Grove, MN (US)

(72) Inventors: John T. Favreau, Spencer, MA (US); Andrew Pic, Northboro, MA (US); Amanda L Smith, Boston, MA (US); Lauren Lydecker, Millbury, MA (US); Travis Henchie, Worcester, MA (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 926 days.

(21) Appl. No.: 17/089,133

(22) Filed: Nov. 4, 2020

(65) Prior Publication Data

US 2021/0128334 A1    May 6, 2021

Related U.S. Application Data

(60) Provisional application No. 62/930,899, filed on Nov. 5, 2019.

(51) Int. Cl.
*A61F 5/00* (2006.01)
(52) U.S. Cl.
CPC .......... *A61F 5/0076* (2013.01); *A61F 5/0089* (2013.01)
(58) Field of Classification Search
CPC .............................. A61F 5/0079; A61F 5/0089
See application file for complete search history.

(56) References Cited

U.S. PATENT DOCUMENTS

| 7,794,447 | B2 | 9/2010 | Dann et al. |
| 7,837,643 | B2 | 11/2010 | Levine et al. |
| 7,846,138 | B2 | 12/2010 | Dann et al. |
| 7,935,073 | B2 * | 5/2011 | Levine ...................... A61F 2/07 |
| | | | 623/23.65 |
| 8,753,407 | B2 | 6/2014 | Nguyen |
| 8,808,270 | B2 | 8/2014 | Dann et al. |
| 9,265,640 | B2 * | 2/2016 | Harris .................... A61F 5/0089 |
| 10,420,665 | B2 | 9/2019 | Sharma et al. |

(Continued)

FOREIGN PATENT DOCUMENTS

| CN | 107405197 A | 11/2017 |
| JP | 2006507910 A | 3/2006 |

(Continued)

OTHER PUBLICATIONS

International Search Report and Written Opinion for the International Patent Application No. PCT/US2020/058833, mailed Feb. 25, 2021, 16 pages.

*Primary Examiner* — Brian A Dukert
(74) *Attorney, Agent, or Firm* — Seager, Tufte & Wickhem, LLP (57) ABSTRACT

The present disclosure relates generally to the field of medical devices and medical device delivery. In particular, the present disclosure relates to medical devices, systems, and methods for delivering a barrier device within a body lumen of a patient, such as the GI tract. For example, a barrier device may include a distal self-expanding stent. A tubular barrier may have a proximal end, a distal end, and a lumen extending therethrough. The distal stent may be disposed at the distal end of the tubular barrier. An anchoring self-expanding stent may be disposed at the proximal end of the tubular barrier.

20 Claims, 6 Drawing Sheets

(56) References Cited

U.S. PATENT DOCUMENTS

| | | | |
|---|---|---|---|
| 10,548,753 B2 | 2/2020 | Rousseau | |
| 10,736,764 B2 * | 8/2020 | Dean | A61F 5/0076 |
| 10,779,967 B2 * | 9/2020 | Walsh | A61F 2/91 |
| 2005/0228504 A1 | 10/2005 | Demarais | |
| 2007/0038290 A1 | 2/2007 | Huang et al. | |
| 2010/0221304 A1 | 9/2010 | Tan et al. | |
| 2011/0276122 A1 | 11/2011 | Schlick et al. | |
| 2014/0236064 A1 | 8/2014 | Binmoeller et al. | |
| 2015/0065939 A1 | 3/2015 | Harris et al. | |
| 2016/0058914 A1 | 3/2016 | Bangera et al. | |
| 2017/0266027 A1 * | 9/2017 | Sharma | A61F 5/0079 |
| 2018/0214293 A1 | 8/2018 | Dean et al. | |

FOREIGN PATENT DOCUMENTS

| | | |
|---|---|---|
| JP | 2011200661 A | 10/2011 |
| JP | 2018534093 A | 11/2018 |
| WO | 2004049982 A1 | 6/2004 |
| WO | 2008005510 A2 | 1/2008 |
| WO | 2008005510 A3 | 3/2008 |
| WO | 2017019913 A1 | 2/2017 |
| WO | 2017029655 A1 | 2/2017 |
| WO | 2017052694 A1 | 3/2017 |

* cited by examiner

BARRIER DEVICES, SYSTEMS, AND METHODS

PRIORITY

This application claims the benefit of priority under 35 USC § 119 to U.S. Provisional Patent Application Ser. No. 62/930,899, filed Nov. 5, 2019, which is incorporated by reference herein in its entirety and for all purposes.

FIELD

The present disclosure relates generally to the field of medical devices and medical device delivery. In particular, the present disclosure relates to medical devices, systems, and methods for delivering a barrier device within a body lumen of a patient, such as a distant or tortuous portion of a gastrointestinal tract ("GI tract").

BACKGROUND

Treating a patient with weight-related or digestive health problems may include a Roux-en-Y or other gastric bypass procedure that may be open, endoluminal, or laparoscopic surgery, wherein the volume and/or pathway between the stomach, the jejunum, and/or the duodenum is reduced. These procedures may reduce the GI tract to absorb materials. Roux-en-Y may be accompanied by numerous health risks. There is a need for an endoscopic device or procedure, which is not surgery, that can provide the same metabolic effects, e.g., as a Roux-en-Y procedure, while reducing risks.

A variety of advantageous medical outcomes may therefore be realized by the embodiments of the present disclosure.

SUMMARY

The present disclosure relates to medical devices, systems, and methods for delivering a barrier device within a body lumen of a patient, such as the GI tract.

An aspect of a barrier device may include a distal self-expanding stent. The barrier device may include a tubular barrier having a proximal end, a distal end, and a lumen extending therethrough. The distal stent may be disposed at the distal end of the tubular member. An anchoring self-expanding stent may be disposed at the proximal end of the tubular barrier.

In various embodiments described here or otherwise, the barrier device may include at least one intermediate self-expanding stent between the proximal end and the distal end of the tubular barrier. The tubular barrier may cover substantially all of the distal stent and the anchoring stent. The anchoring stent may have a shape-memory in an expanded configuration that substantially mimics a contour of an anatomy of a gastric outlet. The distal stent may have a ring-like structure in an expanded configuration. A helical wire may extend about the lumen of the tubular barrier. The tubular barrier may include a plurality of nanofibers throughout a wall of the tubular barrier. An anchoring protrusion may extend from an outer surface of the anchoring stent. The tubular barrier may be semi-permeable. The tubular barrier may be substantially impermeable.

In an aspect, a barrier system may include a catheter including an outer sheath and an inner sheath. A barrier device may be slidably disposed within the outer sheath in a delivery configuration. The barrier device may include a tubular barrier having a proximal end and a distal end. An anchoring self-expanding stent may be disposed at the proximal end of the tubular barrier. The inner sheath may be slidably disposed within the tubular barrier in the delivery configuration.

In various embodiments described here or otherwise, the barrier device may include a distal self-expanding stent at the distal end of the barrier device. The barrier device may include at least one intermediate self-expanding stent between the proximal end and the distal end of the tubular barrier. Each of the at least one intermediate self-expanding stent may have a ring-like structure in an expanded configuration. The inner sheath may include a distal end of the inner sheath that has a diameter substantially as wide as the catheter.

In an aspect, a method for delivering a barrier device may include delivering a self-expanding stent disposed at a distal end of a tubular barrier of the barrier device within a body lumen of a patient. At least a portion of the tubular barrier may be delivered within the body lumen. The self-expanding stent and the portion of the tubular barrier may be translated along the body lumen of the patient via peristalsis.

In various embodiments described here or otherwise, an anchoring self-expanding stent disposed at a proximal end of the tubular barrier device may be positioned within an organ of the patient. The body lumen may be the GI tract and the organ may be the gastric outlet of the stomach. The barrier device may be constrained within a sheath of a catheter in a delivery configuration. Delivering the self-expanding stent may include proximally retracting the sheath of the catheter from about the self-expanding stent. Delivering the at least a portion of the tubular barrier within the GI tract may affect weight loss.

BRIEF DESCRIPTION OF THE DRAWINGS

Non-limiting embodiments of the present disclosure are described by way of example with reference to the accompanying figures, which are schematic and not intended to be drawn to scale. In the figures, each identical or nearly identical component illustrated is typically represented by a single numeral. For purposes of clarity, not every component is labeled in every figure, nor is every component of each embodiment shown where illustration is not necessary to allow those of ordinary skill in the art to understand the disclosure. In the figures.

DETAILED DESCRIPTION

The present disclosure is not limited to the particular embodiments described herein. The terminology used herein is for the purpose of describing particular embodiments only and is not intended to be limiting beyond the scope of the appended claims. Unless otherwise defined, all technical terms used herein have the same meaning as commonly understood by one of ordinary skill in the art to which the disclosure belongs.

Although embodiments of the present disclosure are described with specific reference to embodiments of a medical device delivery system for delivering a medical device (e.g., a barrier device) within a specific portion the GI tract for a particular purpose (e.g., to impact metabolism and affect weight loss), it should be appreciated that such embodiments may be used to deliver a variety of configurations of such medical devices into a variety of different body lumens and/or passageways, for a variety of different purposes, including, for example, anal access to the transverse colon, ascending colon or ileum, Roux-en-Y procedures, jejunocolonic bypass procedures, jejunoileal bypass procedures, gastrectomy procedures, biliopancreatic diversion with duodenal switch (BPD-DS) procedures, gastrojejunostomy procedures, segmental colonic resection procedures, and the like.

As used herein, the singular forms "a," "an," and "the" are intended to include the plural forms as well, unless the context clearly indicates otherwise. The terms "comprises" and/or "comprising," or "includes" and/or "including" when used herein, specify the presence of stated features, regions, steps elements and/or components, but do not preclude the presence or addition of one or more other features, regions, integers, steps, operations, elements, components and/or groups thereof. As used herein, the conjunction "and" includes each of the structures, components, features, or the like, which are so conjoined, unless the context clearly indicates otherwise, and the conjunction "or" includes one or the others of the structures, components, features, or the like, which are so conjoined, singly and in any combination and number, unless the context clearly indicates otherwise. The term "or" is generally employed in its sense including "and/or" unless the content clearly dictates otherwise.

Various embodiments according to the present disclosure are described below. As used herein, "proximal end" refers to the end of a device that lies closest to the medical professional along the device when introducing the device into a patient, and "distal end" refers to the end of a device or object that lies furthest from the medical professional along the device during implantation, positioning, or delivery.

All numeric values are herein assumed to be modified by the term "about," whether or not explicitly indicated. The term "about", in the context of numeric values, generally refers to a range of numbers that one of skill in the art would consider equivalent to the recited value (i.e., having the same function or result). In many instances, the term "about" may include numbers that are rounded to the nearest significant figure. Other uses of the term "about" (i.e., in a context other than numeric values) may be assumed to have their ordinary and customary definition(s), as understood from and consistent with the context of the specification, unless otherwise specified. The recitation of numerical ranges by endpoints includes all numbers within that range, including the endpoints (e.g. 1 to 5 includes 1, 1.5, 2, 2.75, 3, 3.80, 4, and 5).

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

A medical procedure that may reduce and/or delay absorption of digestible material by a GI tract may include providing a barrier device between the digestible material and the absorption anatomy (e.g., portions of the duodenum and/or jejunum of the small intestine). As used herein, "barrier" is intended to include impermeable, semi-permeable, and permeable walls, surfaces, membranes, etc., unless clearly indicated otherwise. A barrier may reduce or eliminate the need to alter anatomy of the patient via an invasive procedure. For example, a tubular barrier within a GI tract may allow passage of materials internally through the tubular barrier without significant (or substantially limited) contact with intestinal tissues and/or digestive enzymes or like fluids along the portion of the intestine occupied by the tubular barrier. Such restricted, limited, or delayed interaction between materials (e.g., stomach chyme) and the GI tract may assist with alleviating or at least positively impacting weight (obesity) and/or diabetic complications. Natural anatomy of the GI tract may be maintained while providing metabolic effects, e.g. prevention of fat and nutrient uptake throughout the length of the duodenum, without invasive surgery.

Figure 1:
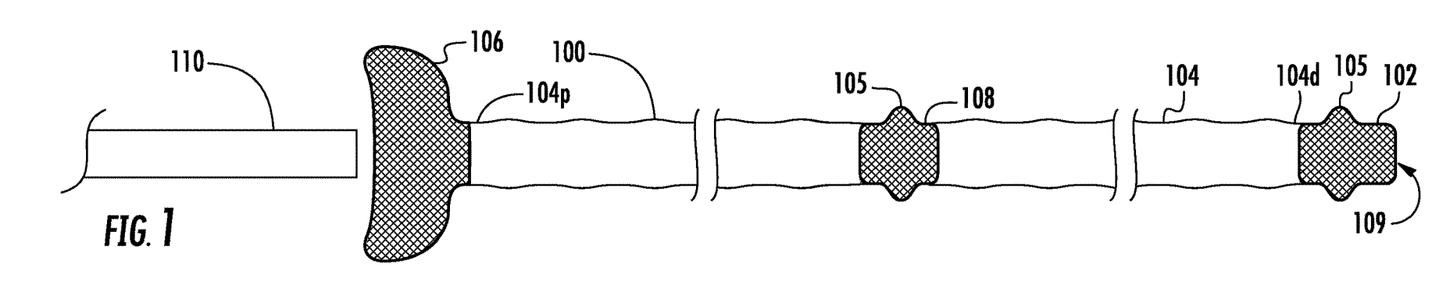
FIG. 1 illustrates a barrier device in an expanded configuration, according to an embodiment of the present disclosure.

With reference to FIG. 1, an embodiment of a barrier device 100 according to the present disclosure is illustrated in an expanded configuration. The device 100 includes a distal self-expanding stent 102. In the expanded configuration, the distal stent 102 has a ring 105 extending circumferentially about the distal stent 102. Although ring 105 is illustrated as a ridge, a ring 105 may be other shapes such as a ring-like shape, a rib, a ridge, a bolus-like shape, a chyme-like shape, a ball, or a combination thereof, or the like. In various embodiments, a stent 102 may have a cross-section that is clover leaf shaped.

The distal stent 102 is disposed at a distal end 104d of a tubular barrier 104. In embodiments, the tubular barrier 104 may be flexible, e.g., compressible and expandable along a central longitudinal axis. Although the ring 105 is illustrated having a diameter wider than a diameter of the tubular barrier 104, a ring 105 may have a diameter that is substantially equivalent or smaller than the tubular barrier 104. An anchoring self-expanding stent 106 is connected to a proximal end 104p of the tubular barrier 104. The anchoring stent 106 has a section of a larger diameter than the remainder of the device 100 and is in a shape that substantially mimics a contour of the anatomy of the gastric outlet of a stomach, but may alternatively be a shape of a cone, frustum, funnel, hemisphere, flange, a combination thereof, or the like, to appropriately mimic the anatomy in which the anchoring stent 106 is intended to anchor the tubular barrier 104. An intermediate self-expanding stent 108 is connected to the tubular barrier 104 between the proximal end 104p and the distal end 104d of the tubular barrier 104 and includes a ring 105 in the expanded configuration. Although one intermediate self-expanding stent 108 is illustrated, any number of intermediate stents 108 may be employed, e.g., 0, 2, 3, 5, 8, 10, 20, etc. The tubular barrier 104 extends throughout the stents 102, 106, 108 such that the stents 102, 106, 108 are encapsulated by the tubular barrier 104. Alternatively, the stents 102, 106, 108 may not be encapsulated by the tubular barrier 104 or may be partially coated by the tubular barrier (e.g., coated along an inside or an outside of the stents 102, 106, 108). A lumen 109 extends through the device 100 (i.e., through the stents 102, 106, 108 and tubular barrier 104). The term coating in this regard and throughout the specification is intended to encompass various means of disposing the stents along the length of the tubular barrier 104 (e.g., by applying a cover, dip coating, spray coating, spin coating, and the like). The device 100 may be delivered and/or deployed from an outer sheath 110.

Figure 2A:
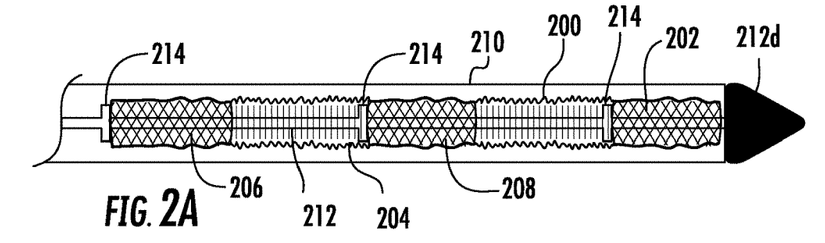
FIG. 2A illustrates a partial cross-sectional view of a barrier system in an unexpanded configuration within a catheter, according to an embodiment of the present disclosure.

With reference to FIG. 2A, an embodiment of a barrier system according to the present disclosure is illustrated, which includes a barrier device 200 in an unexpanded configuration slidably disposed within a catheter. The barrier device 200 includes a tubular barrier 204, a distal self-expanding stent 202, an anchoring self-expanding stent 206, and an intermediate self-expanding stent 208. The catheter includes an outer sheath 210 about the barrier device 200 and an inner sheath 212 slidably disposed within the barrier device 200, when the barrier device 200 is loaded in the catheter for delivery. In other embodiments, the inner sheath 212 may not slide within the barrier device 200. The inner sheath 212 includes a distal end 212d having a diameter substantially as wide as the outer sheath 210. The distal end 212d of the inner sheath 212 tapers distally to a reduced diameter that is configured to atraumatically lead the system distally through anatomies, e.g., an opening of a body lumen. The distal end 212d of the inner sheath 212 constrains the device 200 from sliding distally out of the outer sheath 210. The distal end 212d may allow the system to atraumatically bend or curve through a tortuous portion of a body lumen. In this configuration, the system may be extending into a patient with the device 200 remaining undeployed.

Figure 2B:
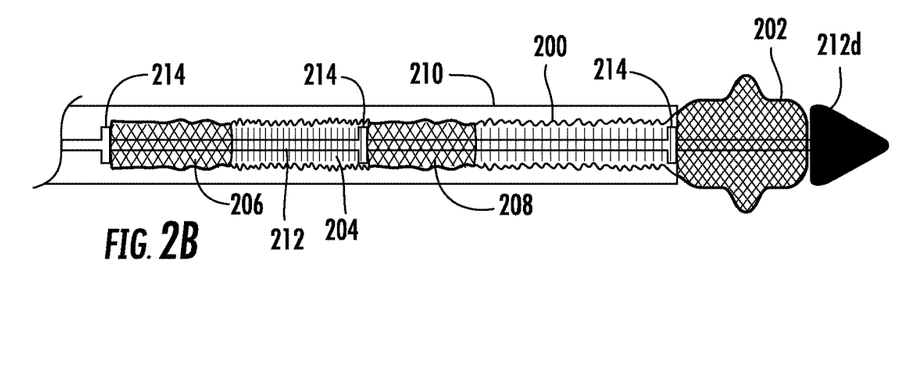
FIG. 2B illustrates the system of FIG. 2A with a distal self-expanding stent being deployed.

With reference to FIG. 2B, the barrier system of FIG. 2A is illustrated with the outer sheath 210 of the catheter translated proximally away from the distal end 212d of the inner sheath 212. The inner sheath 212 includes radial extensions 214 along its length that have a diameter less than the inner diameter of the loaded barrier device 200. The extensions 214 may assist in preventing undesirable proximal translation of the device 200 during delivery of the outer sheath 210 to a target site, e.g., by providing frictional resistance to proximal translation of the device 200. Alternatively, this configuration may be achieved by distally translating the distal end 212d away from the outer sheath 210 of the catheter or proximally translating the outer sheath 210 of the catheter and distally translating the distal end 212d of the inner sheath 212 of the catheter away from each other. With the outer sheath 210 of the catheter spaced away from the distal end 212d of the inner sheath 212, the distal self-expanding stent 202 is unconstrained by the outer sheath 210 and is deployed. The device 200 may be slid distally out of the outer sheath 210 with the assistance of a pusher member (not illustrated) proximal to the device 200 and within the outer sheath 210. In some embodiments, the pusher may maintain the position of the barrier device 200 as the outer sheath 210 is retracted. With the distal self-expanding stent 202 deployed from the outer sheath 210, the distal stent 202 is in the expanded configuration having a ring 205, while the remainder of the device 200 is in the unexpanded configuration. Further distal translation of the distal stent 202 (with respect to the outer sheath 210 by retracting the outer sheath 210 and/or with distal translation of a pusher) may translate the remainder of the device 200, including the tubular barrier 204, anchoring stent 206, and intermediate stent 208, distally out of the outer sheath 210, allowing the device 200 to gradually transition from the unexpanded configuration to the expanded configuration as the device 200 is deployed from the outer sheath 210.

Figure 3A:
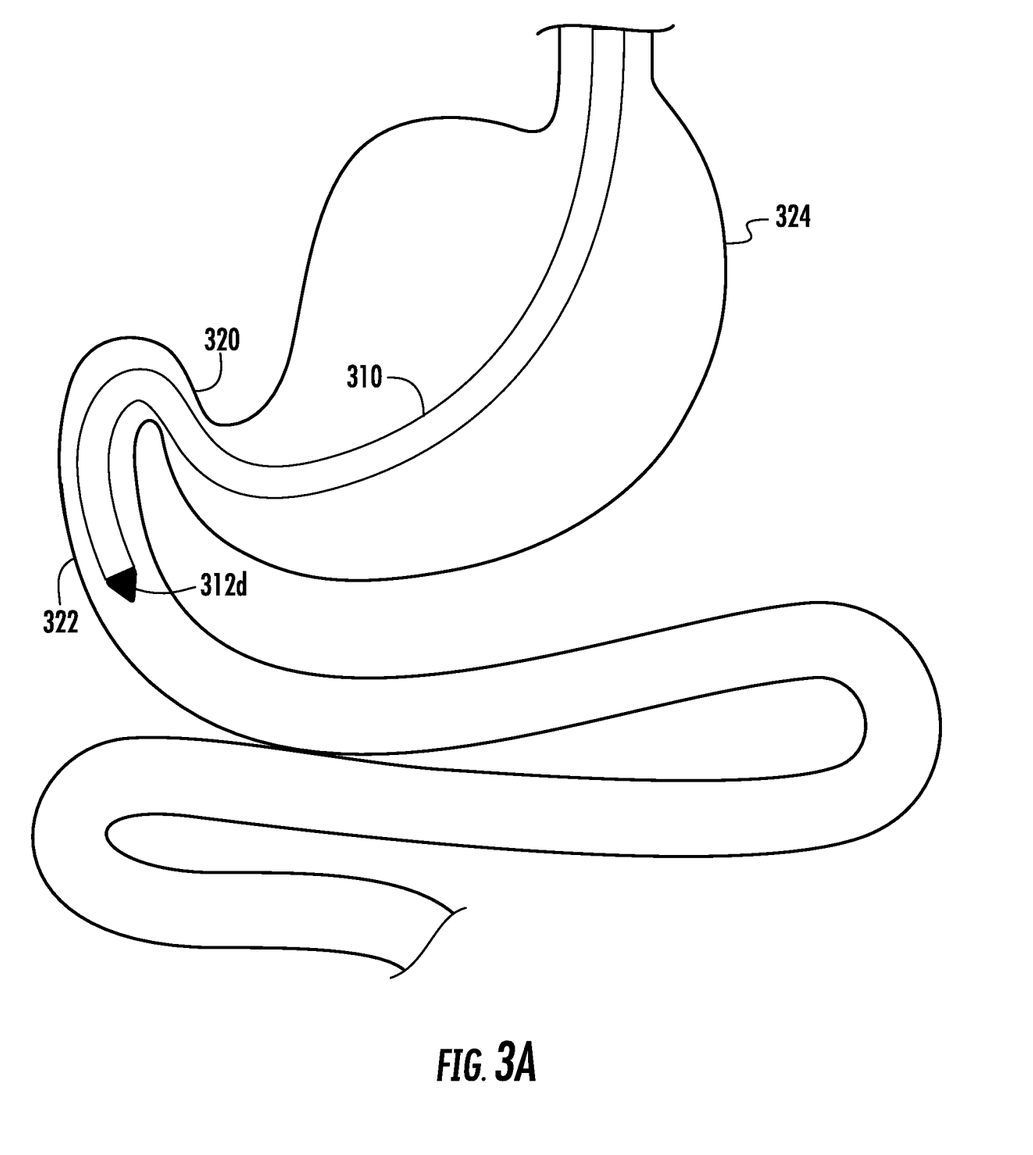
FIG. 3A illustrates a barrier system within a patient with a catheter extending within the GI tract, according to an embodiment of the present disclosure.

With reference to FIG. 3A, an embodiment of a barrier system according to the present disclosure is illustrated, which includes a catheter having an outer sheath 310 that may be delivered through an endoscope and/or over a guidewire (not shown) extended within a stomach 324 of a patient. The outer sheath 310 and a distal end 312d of an inner sheath are being delivered such that the distal end 312d of the inner sheath and a portion of the outer sheath 310 of the catheter may extend some distance, if not entirely, through the pylorus 320 and facing distally toward and/or within the duodenum 322. A barrier device (not illustrated) is disposed (e.g., slidably) within the outer sheath 310 proximal to the distal end 312d of the inner sheath.

Figure 3B:
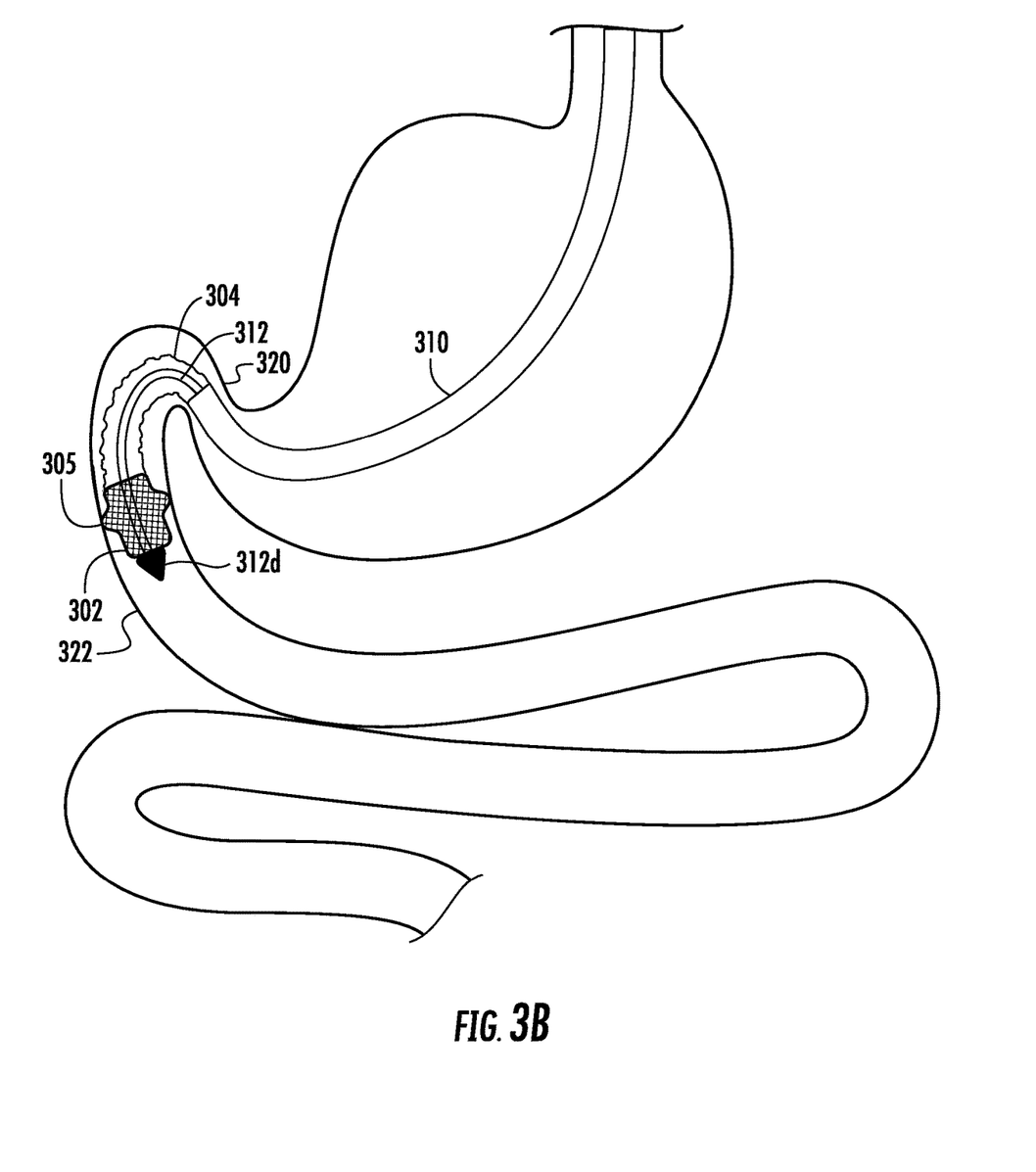
FIG. 3B illustrates the barrier system of FIG. 3A with a distal self-expanding stent being deployed.

With reference to FIG. 3B, the barrier system of FIG. 3A is illustrated with the outer sheath 310 retracted proximally away from the distal end 312d of the inner sheath 312, exposing a distal self-expanding stent 302 and/or a portion of a tubular barrier 304 to the duodenum 322 and/or other section of the intestine. A medical professional may wish to ensure that the distal self-expanding stent 302 is deployed fully within the duodenum 322, e.g., by extending the outer sheath 310 and inner sheath 312 of the catheter into the duodenum 322 past the pylorus 320 such that the distal self-expanding stent 302 does not fully or partially translate proximally into the stomach 324. A ring 305 of the distal stent 302 may contact the walls of the GI tract, e.g., the duodenum 322. Because the ring 305 is similarly shaped to a bolus of stomach materials, smooth muscles of the intestine 322 may contract and generate peristaltic waves that may distally translate the distal stent 302 through the intestine 322 with the tubular barrier 304 in tow. A medical professional may monitor the device being translated through the GI tract, e.g., visualizing through an endoscope by observing identifiable portions or markings of the device sliding out of the outer sheath 310 of the catheter, through fluoroscopy, or the like.

Figure 3C:
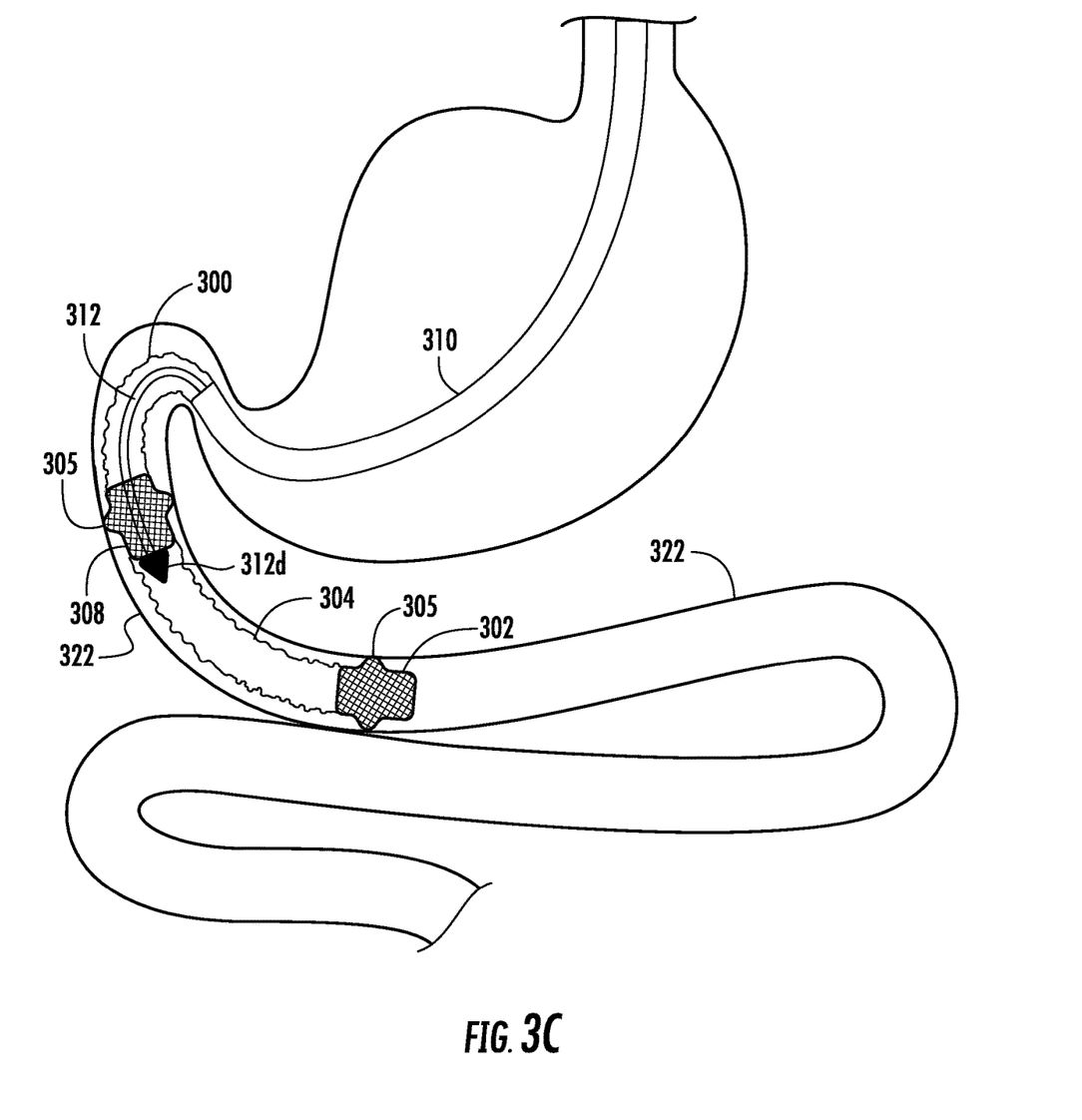
FIG. 3C illustrates the barrier system of FIGS. 3A and 3B with an intermediate self-expanding stent being deployed.

With reference to FIG. 3C, the barrier system of FIGS. 3A and 3B is illustrated with the distal self-expanding stent 302 translated further distally through the intestine 322 by peristalsis. The inner sheath 312 and the outer sheath 310 may be extended further into the duodenum in preparation for deploying the intermediate self-expanding stent 308, such that further proximal retraction of the outer sheath 310 may be assist with deploying the intermediate self-expanding stent 308. The distal translation of the distal stent 302 distally pulls the connected tubular barrier 304 and connected intermediate self-expanding stent 308 out of the outer sheath 310 with or without partial retraction of the outer sheath 310. Additionally or in the alternative, the outer sheath 310 of the catheter may be retracted proximally to assist with deploying the intermediate stent 308. The distal end 312d of the inner sheath 312 resides within a lumen 309 of the barrier device 300 as the device 300 is translated distally. The distal end 312d may be operated to assist with movement and/or orientation of the device 300, or the distal end 312d may play no role in positioning of the device 300. The additional ring 305 on the intermediate stent 308 may provide additional surface area for peristaltic waves to distally translate the device 300 through the intestine 322 and further out of the outer sheath 310. In various embodiments, an intermediate ring 308 may be at about a central point along the device but may be significantly proximal or significantly distal to a central point of a device.

Figure 3D:
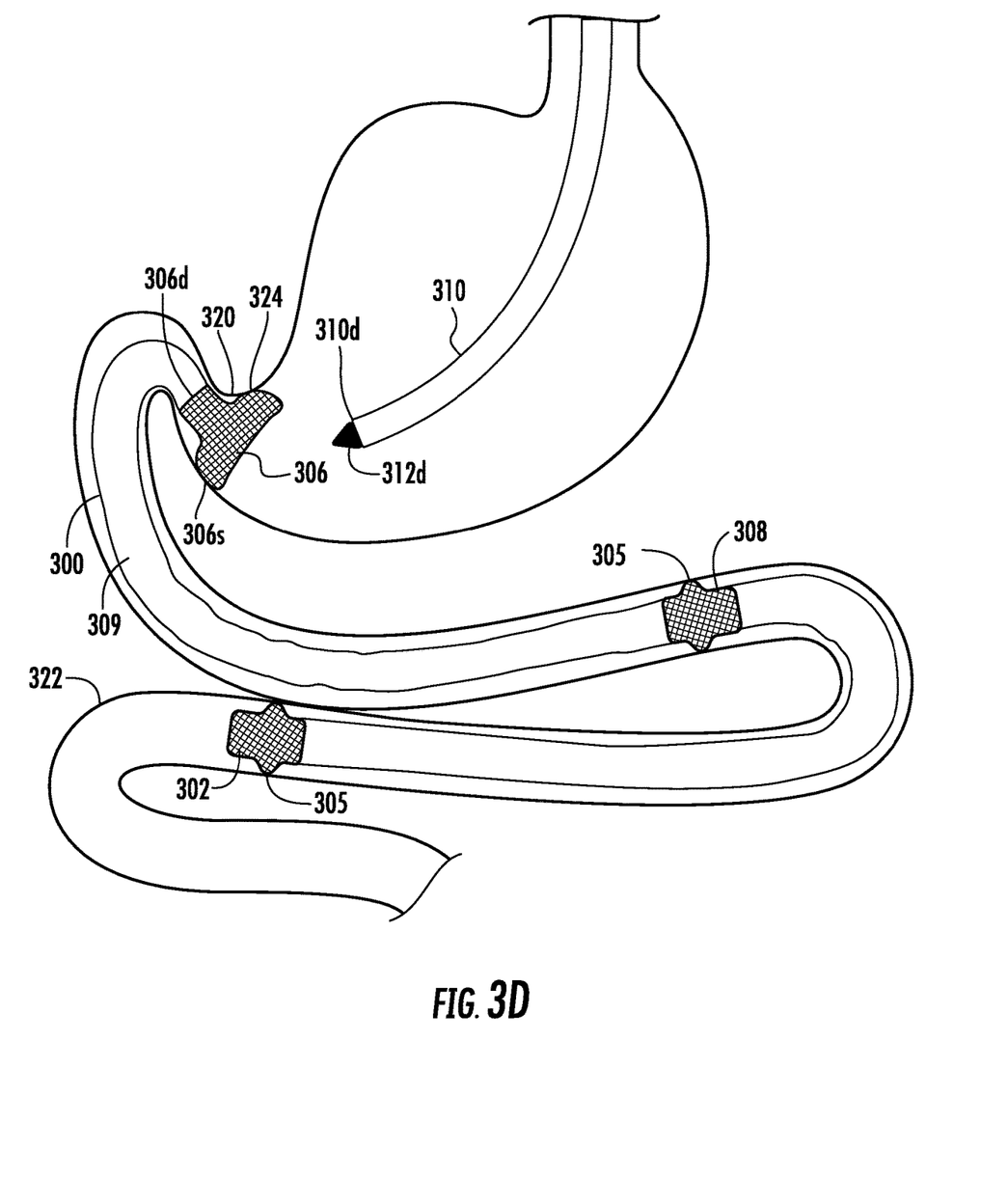
FIG. 3D illustrates the barrier system of FIGS. 3A-3C with an anchoring self-expanding stent delivered.

With reference to FIG. 3D, the barrier system of FIGS. 3A-3C is illustrated with the device 300 delivered in the deployed and expanded configuration. After the self-expanding stents 302, 308 including rings 305 have been deployed into the expanded configuration and translated through the intestine 322 via peristalsis, the outer sheath 310 of the catheter may be proximally translated (e.g., retracted) such that a distal end 310*d* of the outer sheath 310 is within or proximal to the gastric outlet 324. With the distal end 310*d* of the outer sheath 310 proximal to the gastric outlet 324, peristaltic waves acting on the rings 305 may distally pull and slide the anchoring self-expanding stent 306 out of the outer sheath 310. Additionally, or in the alternative, the outer sheath 310 may be proximally retracted to expose the anchoring self-expanding stent 306, deploying the anchoring stent 306 and allowing it to expand. The anchoring stent 306, as depicted, has an overall diameter that is wider than the gastric outlet 324, such that any peristaltic motion that may distally translate the stents 305, 308 may pull the anchoring stent 306 into engagement with the gastric outlet 324. In some embodiments, the anchoring stent 306 may extend across the pylorus 320. In various embodiments, the distal end of the anchoring stent 306 may extend partially or completely across the pylorus 320. The anchoring stent 306 may be anchored in the duodenal bulb on the distal side of the pylorus 320 such that the pylorus 320 is able to function. An anchoring stent 306 extended into or across the pylorus may include a flexible section in the region of the pylorus 320, which may help maintain normal pylorus 320 function. In various embodiments, a distal end 306*d* of the anchoring stent 306 extends across the pylorus 320 may be softer than a remainder of the proximal anchor 306 (e.g., thinner, fewer wires, or the like) such that the pylorus 320 may at least partially function in digestion. The anchoring stent 306 may substantially mimic a contour of the gastric outlet 324 for engagement of the outer surface 306*s* of the anchoring stent 306 with the gastric outlet 324. The outer surface 306*s* may include additional anchoring features such as an adhesive or one or more protrusions such as barbs, hooks, or other fasteners to improve engagement with the gastric outlet 324. With the device 300 deployed, the distal end 312*d* of the inner sheath may be proximally withdrawn from the lumen 309 to the distal end 312*d* of the outer sheath 310. The outer sheath 310 (and an endoscope or other devices if used) may be withdrawn from the patient and the delivered barrier device 300 may be left within the patient so that materials such as chyme may translate through the lumen 309 of the tubular barrier 304 of the device 300. The tubular barrier 304 may be elastic enough to allow peristaltic muscle movement to translate chyme through the device 300 and into the intestine 322 distal to the device 300 such that absorption and/or further digestion of the chyme is decreased and/or delayed. In various embodiments, the rings 305 may be permeable such that fluids may flow through the rings 305 and along an outside surface of the tubular barrier 304 so that the digestive enzymes may meet up with digestible materials at the distal end of the device 300.

Figure 4:
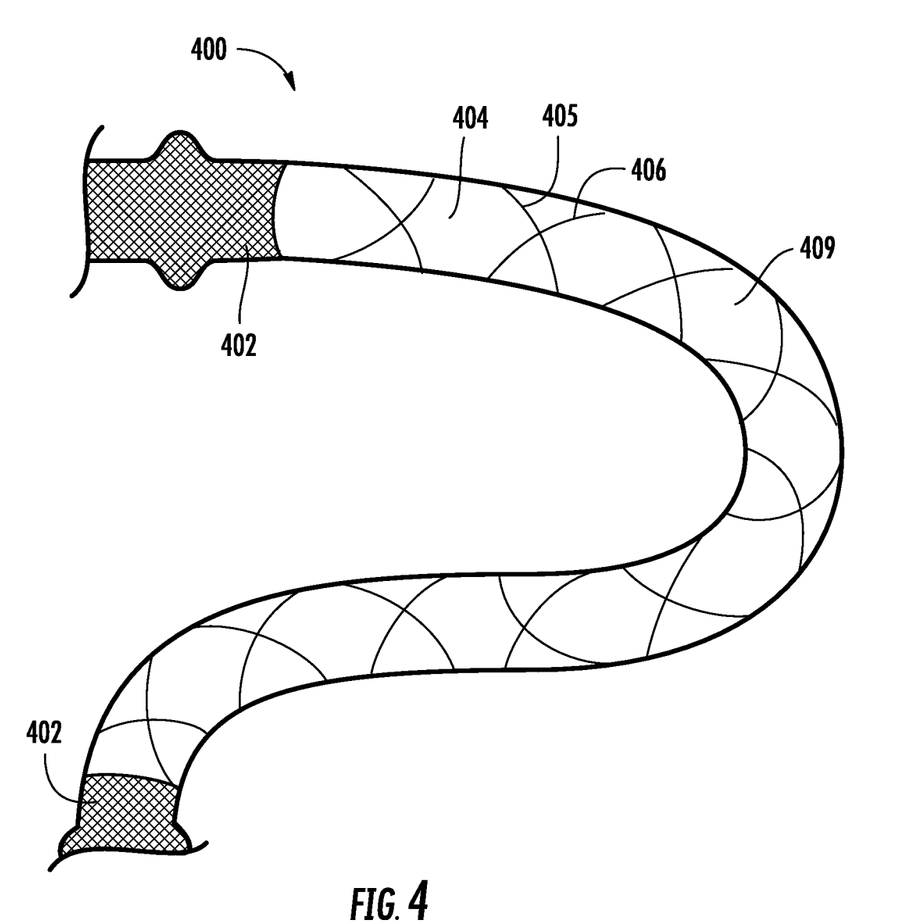
FIG. 4 illustrates a barrier device including helical wires, according to an embodiment of the present disclosure.

With reference to FIG. 4, an embodiment of a barrier device 400 according to the present disclosure is illustrated with a tubular barrier 404 connected to two self-expanding stents 402 at either end. The tubular barrier 404 includes two helical wires 405, 406 about a lumen 409 of the device 400. The helical wires 405, 406 may assist in maintaining lumen 409 patency and general orientation of the device 400 to substantially prevent any significant twisting or distortion. Although two helical wires 405, 406 are illustrated, any number of wires may be employed, e.g., 1, 2, 3, 5, 10, 20, etc., that may be helical, curved, longitudinally straight, circumferential, a combination thereof, or the like.

In various embodiments described here or otherwise within the scope of the present disclosure, a tubular barrier may comprise an elastic material such as silicone, polyethylene terapthelate (PET), nylon, rubber, a combination thereof, or the like. A tubular barrier may allow passage of materials through a lumen of the tubular barrier. Due to the malleability of a tubular barrier, smooth muscles may contract in peristaltic waves to translate materials through the tubular barrier. A tubular barrier may be permeable, allowing a portion of material through the barrier along the device. A permeability of a tubular barrier may be limited by a pore size that may allow passage of some materials while restricting others. A tubular barrier may include nanofibers that may increase rigidity and/or resilience of the tubular barrier compared to a barrier without fibers. The nanofibers may be oriented in patterns, e.g., crisscrossing, or the like.

In various embodiments described here or otherwise within the scope of the present disclosure, a stent may comprise a shape-memory material such as a stainless steel, nitinol, another alloy, a polymer, a combination thereof, or the like. A stent may be exposed, partially covered, or completely covered with a tubular barrier that may increase the barrier characteristics of the stent. A stent and/or barrier device may have various diameters, e.g., a diameter of about 18 millimeters to about 25 millimeters. A device length may vary along the duodenum or an absorption length of the duodenum, e.g., a device length may be greater than about 0 centimeters to about 150 centimeters, a length of about 20 centimeters to about 35 centimeters, a length of about 25 centimeters to about 30 centimeters, or the like. A stent may be knitted, braided, laser cut, etc. A stent may have sufficient radial force to render a body lumen substantially patent, e.g., a radial force greater than about 1.9 Newtons per centimeter. In various embodiments, a stent may have various pore sizes, e.g., a pore size of less than about 5 microns.

In various embodiments, a device may be delivered completely by or assisted with peristalsis. Deployment of the device via peristalsis may take up to about 6 hours and varies depending on the length of the device and number of stents. Peristaltic translation may vary among patients. In some embodiments, all of the stents and anchor may be deployed within a few minutes and peristalsis could translate the device into the delivered configuration post-procedure. A length of a device may be any length within a body lumen(s), for example, between about 25 cm and about 200 cm. For another example, a device may be about 150 cm in length.

In various embodiments, an inner sheath may be solid, hollow, extendable, compressible, a wire, of uniform diameter, and/or of varying diameter. An inner sheath may provide internal mounting support for a barrier device in the delivery configuration.

In various embodiments, the present disclosure is not limited to anchoring a medical device within the gastric outlet. For example, a medical device of the present disclosure may be anchored within an esophagus, a pylorus, a lesser curvature of a stomach, an antrum of the stomach, or the like. In various embodiments, a device or a portion of a device such as one or more stents may be stapled, glued, tacked, sewn, friction fit, or otherwise adhered to an anatomy.

In various embodiments, a method for a medical professional to deliver a barrier device may include delivering a self-expanding stent disposed at a distal end of a tubular barrier of a device within a body lumen of a patient. At least a portion of the tubular barrier may be delivered within the body lumen. The self-expanding stent and the portion of the tubular barrier may be translated along the body lumen of the patient via peristalsis. An anchoring self-expanding stent disposed at a proximal end of the tubular barrier device may be positioned within an organ of the patient. The body lumen may be the GI tract and the organ may be the gastric outlet of the stomach. The barrier device may be constrained within a sheath of a catheter in a delivery configuration. Delivering the self-expanding stent may include proximally retracting the sheath of the catheter from about the self-expanding stent. The patient may be obese and delivering the at least a portion of the tubular barrier within the GI tract may affect weight loss.

All of the devices and/or methods disclosed and claimed herein can be made and executed without undue experimentation in light of the present disclosure. While the devices and methods of this disclosure have been described in terms of preferred embodiments, it may be apparent to those of skill in the art that variations can be applied to the devices and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A barrier device, comprising:
   a distal self-expanding stent having an outer surface extending between a proximal end and a distal end, and a ring spaced proximally from the distal end and extending circumferentially around and radially outwardly from the outer surface of the stent;
   a tubular barrier having a proximal end, a distal end, and a lumen extending therethrough, the distal stent disposed at the distal end of the tubular barrier; and
   an anchoring self-expanding stent disposed at the proximal end of the tubular barrier and shaped to mimic the contour of the anatomy at which the anchoring self-expanding stent is to be anchored;
   wherein the outer surface of the distal self-expanding stent is similarly shaped to a bolus of stomach materials and configured to get distally translated through the intestine, with the tubular barrier in tow, due to peristaltic waves generated by contraction of smooth muscles of the intestine against the outer surface of the distal self-expanding stent.

2. The device of claim 1, wherein the barrier device further comprises at least one intermediate self-expanding stent between the proximal end and the distal end of the tubular barrier.

3. The device of claim 1, wherein the tubular barrier covers substantially all of the distal stent and the anchoring stent.

4. The device of claim 1, wherein the anchoring stent has a shape-memory in an expanded configuration that substantially mimics a contour of an anatomy of a gastric outlet.

5. The device of claim 1, wherein the distal self-expanding stent comprises a shape-memory material.

6. The device of claim 1, further comprising a helical wire extending about the lumen of the tubular barrier.

7. The device of claim 1, further comprising a plurality of nanofibers throughout a wall of the tubular barrier.

8. The device of claim 1, further comprising an anchoring protrusion extending from an outer surface of the anchoring stent.

9. The device of claim 1, wherein the tubular barrier is semi-permeable.

10. The device of claim 1 wherein the tubular barrier is substantially impermeable.

11. A barrier system, comprising:
    a catheter including an outer sheath and an inner sheath; and
    a barrier device slidably disposed within the outer sheath in a delivery configuration, comprising:
    a tubular barrier having a proximal end and a distal end; and
    a distal self-expanding stent at the distal end of the tubular barrier;
    an anchoring self-expanding stent disposed at the proximal end of the tubular barrier;
    wherein the inner sheath is disposed within the tubular barrier in the delivery configuration and has a distally tapered distal end having a proximal diameter substantially as wide as the outer sheath to constrain the barrier device within the outer sheath and from sliding distally out of the outer sheath, and at least one radial extension along its length to assist in preventing translation of the barrier device during delivery.

12. The system of claim 11, wherein the barrier device further comprises at least one intermediate self-expanding stent between the proximal end and the distal end of the tubular barrier.

13. The system of claim 12, wherein the barrier device further comprises a radial extension proximal to each of the distal self-expanding stent and the at least one intermediate self-expanding stent.

14. The system of claim 12, wherein the at least one intermediate self-expanding stent has a ring-like structure in an expanded configuration.

15. The system of claim 11, wherein the distal end of the inner sheath has a diameter substantially as wide as the catheter.

16. A method for delivering a barrier device, comprising:
    delivering a distal self-expanding stent disposed at a distal end of a tubular barrier of the barrier device within a body lumen of a patient, the distal self-expanding stent having an outer surface extending between a proximal end and a distal end and a ring extending circumferentially around and radially outwardly from the outer surface of the stent;
    delivering at least a portion of the tubular barrier within the body lumen; and
    translating the distal self-expanding stent and the portion of the tubular barrier along the body lumen of the patient via peristalsis and contact of the radially-outwardly extending ring with the peristaltically contracting muscles.

17. The method of claim 16, further comprising positioning an anchoring self-expanding stent disposed at a proximal end of the tubular barrier device within an organ of the patient.

18. The method of claim 17, wherein the body lumen is the GI tract and the organ is the gastric outlet of the stomach.

19. The method of claim 16, wherein the barrier device is constrained within a sheath of a catheter in a delivery configuration and delivering the self-expanding stent comprises proximally retracting the sheath of the catheter from about the self-expanding stent.

20. The method of claim 18, wherein the patient is obese and delivering the at least a portion of the tubular barrier within the GI tract affects weight loss.

* * * * *